April 26, 1966    R. S. WATERS ETAL    3,248,154
WHEEL AND AXLE ASSEMBLY FOR HOUSEHOLD APPLIANCES
Filed March 20, 1964

WITNESSES
Theodore F. Wrobel
Benjamin B. Sklar Jr.

INVENTORS
Robert S. Waters
and John W. Gilliom
BY
Robert T. French
ATTORNEY

United States Patent Office 3,248,154
Patented Apr. 26, 1966

3,248,154
WHEEL AND AXLE ASSEMBLY FOR HOUSEHOLD APPLIANCES
Robert S. Waters, Lexington, and John W. Gilliom, Mansfield, Ohio, assignors to Westinghouse Electric Corporation, Pittsburgh, Pa., a corporation of Pennsylvania
Filed Mar. 20, 1964, Ser. No. 353,343
4 Claims. (Cl. 301—1)

This invention relates to wheel and axle assemblies and more particularly to a new and improved assembly of this type for wheeled household appliances.

Heretofore, prior art devices of this type have employed an unnecessary number of parts and have been produced by costly methods of manufacturing.

Offset axles which are formed by bending a wire form or rod into a desired configuration are commonly used in such devices. They can be made inexpensively by simple bending methods, however, as is well known in the art, a radius is formed at the bend which will interfere with the proper rotation of the wheel. In other words, when the hub of the wheel contacts the radius, seizing and misalignment of the wheel occur. These problems can be minimized in various ways, for example, by removing the radius or by providing the assembly with additional parts to prevent the wheel from contacting the radius. Stamping, machining or some other suitable method can be employed to remove the radius, but the cost of an otherwise inexpensive part would be appreciably increased. Obviously, the use of additional parts will also increase the cost.

It is a common expedient to use means such as a cotter pin, a nut or the like at the terminal end of an axle of this type to retain the wheel on the axle. Consequently, it is necessary either to perform unnecessary steps in the process of making the axle or to use more parts in the assembly. For example, if a nut is used it would be necessary to thread the axle and if a cotter pin is used it would be necessary to bore a hole in the axle.

The present invention provides a less expensive and more satisfactory assembly by eliminating unnecessary steps in the fabrication of the assembly and by employing a minimum number of parts.

Accordingly, it is the general object of this invention to provide a new and improved axle and wheel assembly of this type which can be manufactured at low cost and which is extremely easy to assemble.

Another object of this invention is to provide an axle and wheel assembly which can be manufactured of wire form and phenolic by simple bending and molding methods.

A further object of this invention is to provide a new and improved wheel and axle assembly in which the wheel is self-contained, requiring no aids to hold it in place.

Further objects and advantages of this invention will become apparent as the following description proceeds and features of novelty which characterize the invention will be pointed out in particularity in the claims annexed to and forming a part of this specification. For a better understanding of this invention, reference may be had to the accompanying drawing, in which:

Figure 1:
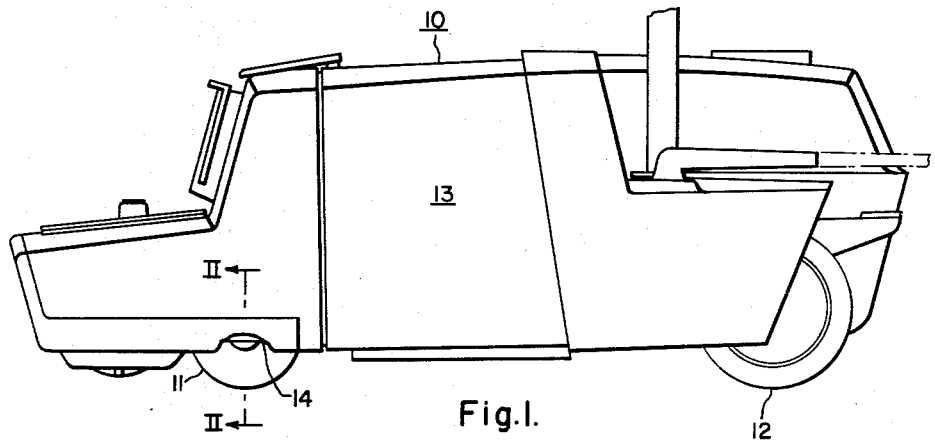
FIGURE 1 shows a suction cleaner incorporating one embodiment of the invention.

Referring to the drawings, particularly FIG. 1, reference character 10 designates generally a suction cleaner carried by a pair of front wheels 11 and a pair of rear wheels 12 only one of each pair being shown. The suction cleaner is provided with a housing 13 having depending walls 14, the purpose of which will be hereinafter discussed.

Figure 2:
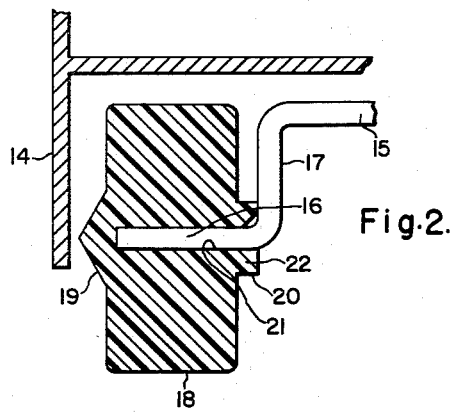
FIG. 2 is an enlarged cross-sectional view taken on line II—II of FIG. 1, representing one embodiment of the wheel and axle assembly.

One embodiment of the invention, shown in FIG. 2, comprises an offset axle 15 having a pair of horizontal wheel-carrying extensions 16 connected thereto by a pair of upwardly extending portions 17, disposed at right angles with respect to the horizontal extensions and having radiused connections therewith. The horizontal extensions 16 serve to rotatably support the wheels 11 while the upwardly extending portions, cooperating with means to be discussed below, serve to axially position the wheels on the horizontal extensions. The axle, made from any suitable material, for example, wire form, can be formed inexpensively by simple bending techniques.

The wheel 11, made from any suitable material, for example, phenolic, comprises a cylindrical body 18 having mutually parallel inner and outer walls. A protrusion 19 axially disposed on the outer wall of the body 18 is effective to retain the wheel on the horizontal extension without retarding the rotation of the wheel. To this end, protrusion 19 is preferably conical in shape in order to minimize the area of contact between it and the depending wall 14 of the housing 13. As viewed in FIG. 2, axial movement of the wheel 11 to the left relative to the wheel-carrying extension 16 is limited due to the abutment of the protrusion 19 against the depending wall 14.

A boss 20 axially disposed on the inner wall of the body 18 intermediate said inner wall and the upwardly extending portion 17 serves to position the wheel 11 on the horizontal extension 16 at a predetermined distance from the upwardly extending portion thereby causing the wheel to ride squarely on the extension 16. The wheel is provided with a blind longitudinal centrally located bore 21 which extends longitudinally from the right end of the boss 20, as viewed in FIG. 2, to a point approaching the protrusion 19. With the extension 16 inserted in the circular bore 21 the wheel 11 is captivated between the depending wall 14 and the upwardly extending portion 17. The bore 21 is chamfered as indicated at 22 to provide a clearance between the boss and the radius to permit unimpaired rotation of the wheel on the horizontal extension.

Assembly of the wheel 11 and the axle 15 can easily be accomplished by inserting the horizontal extension 16 into the bore 18 and then mounting the axle into the cleaner in a position whereby the protrusion 19 is axially aligned with the depending wall 14.

While various methods of manufacture may be utilized to produce the wheel, the preferred method is to mold the wheel by a compression molding process.

Figure 3:
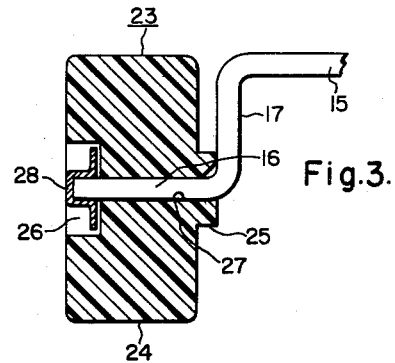
FIG. 3 is an enlarged, sectional view showing a modified form of the wheel.

Another embodiment of the invention, shown in FIG. 3, identical to the embodiment shown in FIG. 2 with the exception of a means for retaining the wheel on the axle, comprises a wheel 23 having a cylindrical body 24 and an offset axle 15 having horizontal extensions 16 and upwardly extending portions 17. The inner wall of the wheel 23 is provided with a boss 25, identical to the boss 20 of FIG. 2 in structure as well as function, while the outer wall is provided with a recess 26.

The wheel 23 is provided with a centrally located bore 27 which extends axially from the right end of the boss 25 as viewed in FIG. 3, and terminates in the recess 26. The terminal end of the horizontal extension 16 projects from the cylindrical bore 27 into the recess 26 for receiving a drive nut 28 or the like which serves to retain the wheel on the horizontal extension.

The drive nut 28, being disposed within the recess 26, is protected from damage or inadvertent removal by bumping.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. In a wheeled household appliance, in combination, an offset axle having a horizontal extension and an upwardly extending portion, said horizontal extension and said upwardly extending portion being substantially perpendicular to each other and having a radius formed therebetween, a molded wheel having a longitudinal centrally located bore for receiving said horizontal extension, said wheel comprising, a body having an inner wall and an outer wall, integrally formed means axially disposed on said inner wall and cooperating with said upwardly extending portion for positioning said wheel on said horizontal extension, said bore extending through and being chamfered adjacent said means to provide a clearance between said bore and said radius, and means axially disposed on said outer wall for preventing removal of said wheel.

2. The structure recited in claim 1 wherein said means axially disposed on said inner wall comprises a circular boss and said means axially disposed on said outer wall comprises a conical protrusion.

3. In a wheeled household appliance, in combination, an offset axle having a horizontal extension and an upwardly extending portion, said horizontal extension and said upwardly extending portion being substantially perpendicular to each other and having a radius formed therebetween, a molded wheel having a blind longitudinal centrally located bore for receiving said horizontal extension, said wheel comprising a body having mutually parallel inner and outer walls, a circular boss disposed on said inner wall for positioning said wheel on said horizontal extension, said boss being effective to abut said upwardly extending portion whereby said wheel rides squarely on said horizontal extension, said bore extending through said boss and being chamfered adjacent its open end to provide a clearance between the boss and the radius whereby seizing between said boss and said radius is minimized, and means for preventing removal of said wheel.

4. In a wheeled household appliance having a housing with depending walls, an offset axle having a horizontal extension and an upwardly extending portion, said horizontal extension and said upwardly extending portion being substantially perpendicular to each other and having a radius formed therebetween, a molded wheel having a partial longitudinal centrally located bore for receiving said extension, said wheel comprising, a body having mutually parallel inner and outer walls, a circular boss disposed on said inner wall, said boss being effective to abut said upwardly extending portion whereby said wheel rides squarely on said horizontal extension, said bore extending through said boss and being chamfered at its open end to provide a clearance between the boss and said radius, a conical protrusion axially disposed on said outer wall, said protrusion being effective to abut one of said depending walls whereby said wheel is retained on said horizontal extension.

References Cited by the Examiner

UNITED STATES PATENTS

| 301,376 | 7/1884 | Lloyd | 301—5.3 |
| 763,511 | 6/1904 | Rowell | 301—127 |
| 2,180,060 | 11/1939 | Kenyon | 301—1 X |
| 2,228,528 | 1/1941 | Miller | 15—41 |
| 2,377,855 | 6/1945 | Ambrosini. | |
| 2,669,485 | 2/1954 | Newman et al. | 301—5.3 |

FOREIGN PATENTS 584,413   1/1947   Great Britain.

BENJAMIN HERSH, *Primary Examiner.*

ARTHUR L. LA POINT, *Examiner.*